Nov. 9, 1948.     L. D. STATHAM     2,453,548
ACCELEROMETER WITH ELECTRIC STRAIN WIRES
Filed July 14, 1947
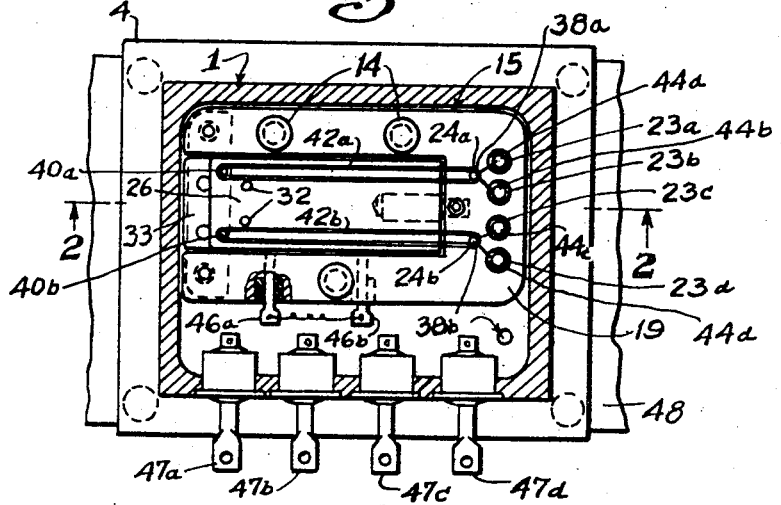
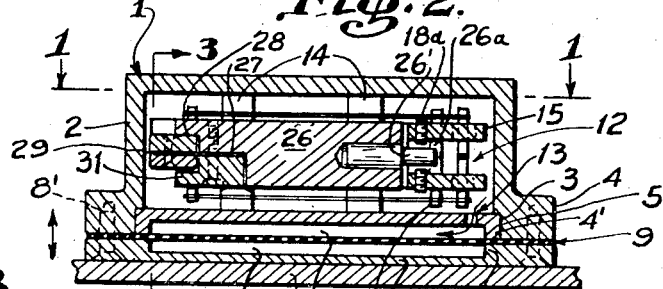
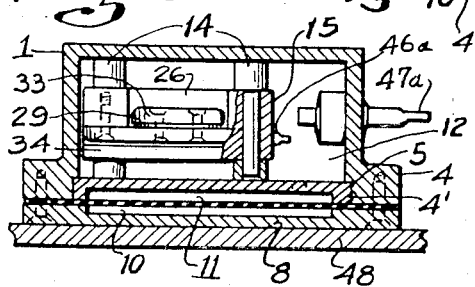
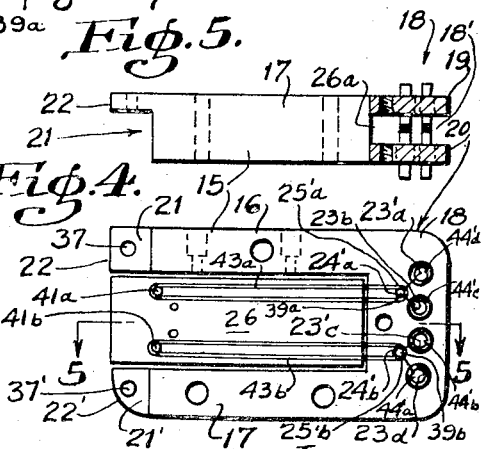
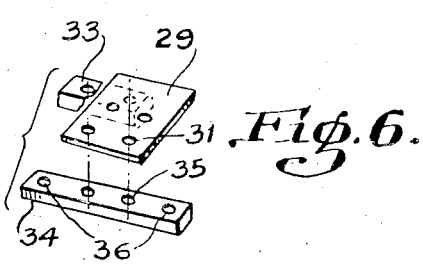
INVENTOR.
Louis D. Statham
By
ATTORNEY.

Patented Nov. 9, 1948

2,453,548

UNITED STATES PATENT OFFICE 2,453,548

ACCELEROMETER WITH ELECTRIC STRAIN WIRES

Louis D. Statham, Beverly Hills, Calif., assignor to Statham Laboratories, Inc., Los Angeles, Calif., a corporation of California Application July 14, 1947, Serial No. 760,775

10 Claims. (Cl. 201—63)

This invention relates to a strain wire accelerometer. Strain wire accelerometers employing unbonded strain wires have found great utility, and such accelerometers are described in an article by Richard D. Meyer, published in "Instruments," vol. 19, No. 3, of March, 1946.

Accelerometers employing strain wires such as are described in the above article are of two types: The beam type comprising weighted cantilever beams to which a bonded strain gauge is attached to measure the bending of the beam. The strain wires do not enter into the system as a force transmitting or resisting element. The other type may be termed a suspended mass accelerometer in which a mass is supported on the strain wires of a strain gauge. The forces of acceleration are not applied to a comparatively stiff beam, but directly to the strain sensitive wires.

Essentially such accelerometers are composed of a frame upon which a mass is suspended by wire springs so that the mass moves upon acceleration in a direction substantially parallel to the wires. In one form the mass carries four pins which coact with four pins on the frame. Four loops of strain sensitive wire are wound on the pins. These wires are wound under tension. Two loops extend in one direction from the axis of the mass to the frame and two loops extend in an opposite direction. Upon movement of the mass, which is constrained by springs to move in a path parallel to the strain wires, the loops on one side of the vertical axis are shortened to release the strain, while the wires on the two loops are lengthened to increase the strain. The permissible travel of the mass is controlled by a stop and is limited not to exceed about 0.0015" either side of neutral.

Another form which has been suggested suspends the mass on three loops of wires, all ending in a direction perpendicular each to the other and the mass being free to move in either a horizontal or vertical plane. The wires thus extend in a direction parallel to the direction of each of the three degrees of freedom of motion of the suspended mass.

In all such strain wire assemblies where the function depends upon the change in resistance of the strain wires, in order to get measurable changes in resistance it is necessary to use wires of considerable length, and therefore it is necessary to separate the points of support of the wires by a considerable distance, and the gauge in the direction of the applied accelerating force or in the direction of motion of the accelerated mass will necessarily be of substantial dimension.

For many uses the space requirements make it highly advantageous to reduce the dimension of the instrument in the direction of the accelerating force. Thus, in measuring the acceleration of the airplane wing tips, where the accelerometer is to be placed inside the wing, it is essential to place the accelerometer at the tip where space restrictions are limited.

I have devised an unbonded strain wire accelerometer in which the strain wires are all disposed in a direction substantially perpendicular to the line of the accelerating force and substantially perpendicular to the permissible motion of the accelerated mass, and thus have been able to reduce the dimension of this instrument in this direction without sacrificing the output or sensitivity of the instrument.

In linear accelerometers employing unbonded strain wire elements, in which the accelerated mass is suspended directly on the strain wires, the accelerating force is transmitted directly to the wires. Thus, to obtain a practical power output from the instrument, that is, an appreciable total change in the resistance of the strain wires of the instrument, it is necessary to have wires of appreciable length and thus the weight which is required may become large. This increases the dimension and weight of the instrument.

However, in many applications, especially where the acceleration of a small mass is to be measured, it is desirable to hold the mass of the instrument as small as possible. Thus it is desirable that the mass of the instrument does not add appreciably to the mass whose acceleration is to be measured. It thus becomes desirable to reduce the mass of the accelerometer. It is desirable to do so, however, without appreciably reducing the power output of the accelerometer and this presents a dilemma, since in the accelerometers where the mass is directly suspended or connected to the strain wires, such as those mentioned above, these are contradictory requirements.

I have devised a new form of linear accelerometer which solves the above dilemma and have thus been able to produce a linear accelerometer of a reduced mass without sacrificing power output.

I accomplish this desirable result by building a mechanical advantage into the accelerometer whereby the inertial mass of the accelerometer is connected to the strain wires through a lever system so that the inertial mass acts upon the strain wires through the mechanical advantage of said lever system.

I thus suspend the inertial mass upon a cantilever suspension about a hinge connected to the inertial mass at one end thereof and the other end being free, the hinge being also mounted on a frame or support. The inertial mass is restrained by means of strain wires which extend to connect the inertial mass to the frame, so that when the inertial mass moves about its hinge point, the tension in the wires is altered to give a measurable variation in resistance.

In the preferred embodiment of my invention the wires are strung between the frame and the inertial mass so that the locus of motion of the center of mass of the inertial mass moves in a path substantially transverse, that is, perpendicular to the wires.

The wires are strung between pins which are so positioned that one of the pins is stationary in the frame while the other pin is mounted on the inertial mass near the hinge axis. When the inertial mass is deflected from rest, the pin on the inertial mass pivots through an arc which, by reason of the limit motion stops and the other parameters of the instrument, is less than about 1°.

In this sense the locus of motion of the center of mass may be taken to be substantially the tangent of the arc of such locus and sensibly perpendicular to the strain wires.

The center of mass thus acts upon the strain wires through a lever system in the nature of a bell crank and thus acts through a mechanical advantage to multiply the force exerted on the strain wires by such lever ratio.

It will thus be seen that a smaller mass is required to cause the same variation in tension in the wires than is required to cause such variation in tension when the inertial mass is suspended directly upon the wires.

Another desirable property of my accelerometer is that the dimension of the instrument in the direction of the accelerating force is made small, since the wires whose length affects the maximum dimension of the instrument extend in a direction perpendicular to the direction of such force.

A third property of the above design is that for any given magnitude of accelerating force the movement of the inertial mass is greater, for an equal total resistance change in the wires, than where the mass is suspended directly on the wires. Thus, the natural frequency of my new accelerometer is lower than in the case of such other type. For some purposes this lower natural frequency may be advantageous.

These and other objects and advantages will be clear from the further description of my new accelerometer when read in connection with the drawings, in which Fig. 1 is a horizontal section of my accelerometer taken on line 1—1 of Fig. 2;

Fig. 2 is a vertical section taken on line 2—2 of Fig. 1;

Fig. 3 is a section taken on the line 3—3 of Fig. 1;

Fig. 4 is a plan view of the frame;

Fig. 5 is a section on line 5—5 of Fig. 4;

Fig. 6 is an exploded view of the spring hinge and clamping members.

The accelerometer is mounted inside of the case 1 which is covered by a cover 2 set into a shoulder 3 formed in the bottom of case 1. Case 1 carries a rim 4 cooperating with the rim 4' of the case 1 to form a base for the instrument. Upon the base is set a flexible diaphragm 9 which is held in place by a case plate 6 having an upstanding rim 7 and which is clamped to case 1 by means of screws 8'. There is thus provided chambers 10 and 11 on each side of the diaphragm 9. The chamber 12 inside the cover 2 and the space 11 are connected by bore 13.

Mounted on posts 14 which clamp the accelerometer between the top of the case 1 and the cover 2 is the frame 15 of the accelerometer. Frame 15 is in the form of a U-shaped member having legs 16 and 17 and a base 18. The base 18 is slotted at 18' to give lips 19 and 20. The ends of the legs 16 and 17 are notched at 21 and 21' to give lips 22 and 22'. Positioned in lips 19 are four bores 23a, 23b, 23c, and 23d. Similarly positioned in lip 20 are four bores 23'a, 23'b, 23'c, and 23'd, axially aligned with the bores 23a to 23d, respectively. Also positioned in lip 19 are two bores 24a and 24b whose line of center is parallel to the line of center of the bores 23a to 23d and which are spaced intermediate the legs 16 and 17. Positioned in lip 20 are two bores 25'a and 25'b whose axes are coincident with the axes 24a and 24b respectively.

The inertial mass 26 is in the form of a block, one end of which is formed in two steps 27 and 28. A flat flexible spring 29 is clamped on the tread of step 27 by means of an L-shaped clamping block 31 which is held by means of two screws 32 which pass through bores provided in the spring and in the tread of the step 27 and in the L-shaped block 31. A spring 29 is clamped to the frame by means of clamping bars 33 and 34. The long clamping bar 34 is held upon the lip 22 and 22' by means of screws passing through bores 36, 37, and 37'. The spring 29 is clamped to the bar 34 by means of a clamping bar 32' and screws which pass through the bores 33, 34, and 35, respectively. Thus, these clearances are provided between the contiguous faces of the tread of the step 28, the riser of the step 28, and the L faces of the block 31, and the opposing faces of the clamping blocks 32 and 34, as shown in Fig. 2. The opposite end of the inertial mass 26 is freely suspended and is bored at the pin 26' which passes through a slot 26a into which slot pass two adjusting stop screws 19a, which pass through suitable bores provided in the lips 19 and 20.

Positioned in the bores 24a and 24b are two anodized aluminum pins and positioned in the bores 25a and 25b on the underneath face of the lip 20 are two similar anodized pins 39a and 39b. Two anodized aluminum pins 40a and 40b are mounted on the upper face of the inertial mass 26 in line with the pins 39a and 39b and the axes of said pins 40a and 40b are in line with the hinged point of the inertia mass, to wit, they are over the space between the clamping bars and the rise of the tread 28 and the opposing face of the L-shaped block 31. Two anodized aluminum pins 41a and 41b are positioned on the underneath face of the L-shaped block 31 coaxially disposed with the pins 40a and 40b and are therefore in line with the pins 39a and 39b. Pins are thus positioned on each of the opposite complementary coplanar faces of the inertial mass and of the frame, the pins on the opposite faces of the frame being positioned adjacent the free end of the inertial mass, and the pins on the opposite faces of the inertial mass complementary to the faces of the frame being positioned on the inertial mass adjacent the hinge axis.

Wound between the pins 38b and 40b is a loop of strain wire 42b similar to those described in the above mentioned article, and similarly wound on pins 38a and 40a is a loop of similar strain wire 42a. In like manner loops of wire 40a and 43b are wound on the pins 41a and 39a and 41b and 39b, respectively. The terminal posts in the form of metallic pins 44a, 44b, 44c, and 44d, and 44'a, 44'b, 44'c, and 44'd, respectively pass through insulating bushings positioned in the bores 23a to 23d and 23' to 23'd respectively. The ends of the loops 42b are connected respectively to the posts 44c and 44d as are the ends of the loops 43a connected to the posts 44a and 44b, respectively, and the ends of the loops 42'a are connected to the posts 44'a and 44'b, respectively, and the ends of the loops 42'b are connected to the terminal posts 44'c and 44'd, respectively. The terminals 46a and 46b are suitably insulated therefrom by bushings.

It will be observed that because of the anodized pins the strain wires are insulated from the frame and from the inertial mass and from the case, and are electrically connected to the terminals 44a and 44d, as stated above. The wires are spaced from and are substantially parallel to the complementary faces of the inertial mass and frame, and thus constitute unbonded strain wire elements. The pins 44a and 44'a may be in the form of a single pin, as illustrated in the drawing, and in like manner pins 44d and 44'd may form one continuous metallic pin. The ends of the loop of the strain wire 42a are connected to the pins 44a and 44b and the ends of the loops 42b are connected to the pins 44c and the pins 44d. The ends of the loops 42'a are connected to the pins 44'a and 44'b and the ends of the loops 42'b are connected to the pins 44'c and 44'd. The terminal pin 46a is connected to the pin 44'c by an insulated cross wire connection and the terminal pin 47b is connected to the pin 44'b. The pins 44c and 44'b are cross connected by wire, making electrical contact with said pins and insulated from the frame. Terminal contact 47a connects the pins 44a and 44'a. Terminal 47b connects to the pin 44d and 44'd. Terminal 47c connects to 44'b and the terminal 46d connects to either 46a or 46b. The loops of wire are thus connected in a four-leg Wheatstone bridge arrangement with the balancing wire strung between the terminals 46a and 46b, acting as a balancing resistance to balance the Wheatstone bridge when the accelerometer is in rest position.

When such an accelerometer is mounted upon a base such as 48 it will measure acceleration normal to the base, i. e., in the direction of arrow shown in Fig. 2. The linear acceleration measured is in a direction substantially perpendicular to the wires. The dimension of the instrument in the direction of acceleration to be measured may then be made small without sacrificing the power output; in other words, the wires may be made as long as is desirable without increasing the height of the instrument in the direction of the accelerating force.

On acceleration of the instrument the inertial mass is deflected either side of the rest position shown in Fig. 2, depending upon the direction of the acceleration. Thus, if the instrument is accelerated, causing the pins 40a and 40b and 41a and 41b to tilt from their normally vertical position, the length of wires 42a and 42b or 43a and 43b, respectively, increases, depending upon the direction in which the accelerating force is applied, and the wires on the other side of the instrument are caused to shorten.

It will thus be seen that the force imposed upon the wires and therefore the degree of extension or contraction of the wires upon any linear acceleration of the instrument normal to the strain wires is directly proportional to the mass of the inertial mass 26 times the distance of the center of mass from the hinge axis of the instrument, to wit, from the point of bending of the spring 29. The accelerometer is thus linear in character. The main restoring force is the tension of the wires, the spring entering therein in an insubstantial manner, for example, contributing about 5 to 10% of the restraint.

The weight of the inertial mass that would be then necessary to obtain any given variation in the restraint of the wires is reduced by the mechanical advantage of this lever system. It has been found, for example, that it would be possible to use an inertial mass of weight from ⅓ to ⅕ of that which is required in the instruments according to the design described in the above mentioned article to obtain an equal power output, i. e., total variation in resistance of the strain wire, by reason of the fact that from 3 to 5 times the mechanical advantage which is built into the instrument according to the present design.

The same mechanical advantages require that the degree of deflection of the inertial mass from rest position for any given variation in the resistance of the wires is greater than if the same inertial mass were suspended directly on the same strain wire as in the aforementioned design. The result is that the natural frequency of the instrument is lower by reason of the greater displacement upon the imposition of any given accelerating force which gives a like total power output.

While I have described a particular embodiment of my invention for the purpose of illustration, it should be understood that various modifications and adaptations thereof may be made within the spirit of the invention as set forth in the appended claims.

I claim:

1. A strain wire accelerometer, comprising a frame, an inertial mass hingedly mounted at one end upon said frame, the other end of said mass being free to move about said hinge, and a strain wire connected to said frame and said mass.

2. A strain wire accelerometer, comprising a frame having opposite faces, an inertial mass having opposite faces, a hinge mounted upon said frame and upon one end of said inertial mass, a strain wire support mounted on one face of said frame and another support mounted on one of the faces of said mass, a strain wire mechanically connected to said supports, a strain wire support on the opposite face of said frame, a strain wire support on the opposite face of said mass, and a strain wire mechanically mounted on said last-named supports.

3. A strain wire accelerometer, comprising a frame having opposite faces, an inertial mass having opposite faces, a hinge mounted upon said frame and upon one end of said inertial mass, a strain wire support mounted on one face of said frame and another support mounted on one of the faces of said mass, a strain wire mechanically connected to said supports, a strain wire support on the opposite face of said frame, a strain wire support on the opposite face of said mass, and a strain wire mechanically mounted on said last-named supports, said wires extending substantially parallel to said faces and substantially perpendicular to the axis of said hinge, 4. A strain wire accelerometer, comprising a frame having opposite faces, an inertial mass having opposite faces complementary to the faces of said frame, a hinge mounted upon said frame and upon one end of said inertial mass, the other end of said mass being free, a pin mounted upon each of the opposite faces of said mass and positioned on said mass adjacent the axis of said hinge, pins mounted on the opposite faces of said frame adjacent the free end of said mass, and strain wires mechanically mounted upon and extending between the pins on the complementary faces of said frame and mass.

5. A strain wire accelerometer, comprising a frame having opposite faces, an inertial mass having opposite faces complementary to the faces of said frame, a hinge mounted upon said frame and upon one end of said inertial mass, the other end of said mass being free, a pin mounted upon each of the opposite faces of said mass and positioned on said mass adjacent the axis of said hinge, pins mounted on the opposite faces of said frame adjacent the free end of said mass, and strain wires mechanically mounted upon and extending between the pins on the complementary faces of said frame and mass and extending substantially parallel to said faces and substantially perpendicular to the axis of said hinge.

6. A strain wire accelerometer, comprising a frame, an inertial mass, a flat spring connecting one end of said inertial mass to said frame, the other end of said inertial mass being free to move on the bending of said spring, and a strain wire connected to said frame and to said mass, said strain wire extending in a direction perpendicular to the axis of bending of said spring.

7. A strain wire accelerometer, comprising a frame having opposite faces, an inertial mass having opposite faces, a flat spring, means for connecting said hinge to said frame and to one end of said inertial mass, the other end of said inertial mass being free, a strain wire support mounted on one face of said frame and another support mounted at one of the faces of said mass, a strain wire mechanically connected to said supports, a strain wire support on the opposite face of said frame, a strain wire support on the opposite face of said mass, and a strain wire mechanically mounted on said last-named supports.

8. A strain wire accelerometer, comprising a frame having opposite faces, an inertial mass having opposite faces, a flat spring, means for connecting said hinge to said frame and to one end of said inertial mass, the other end of said inertial mass being free, a strain wire support mounted on one face of said frame and another support mounted at one of the faces of said mass, a strain wire mechanically connected to said supports, a strain wire support on the opposite face of said frame, a strain wire support on the opposite face of said mass, and a strain wire mechanically mounted on said last-named supports, said wires extending substantially parallel to said faces and substantially perpendicular to the axis of bending of said spring.

9. A strain wire accelerometer, comprising a frame having opposite faces, an inertial mass having opposite faces complementary to the faces of said frame, a flat spring mounted on said frame and upon one end of said inertial mass, the other end of said mass being free, pins mounted on each of the opposite faces of said mass and positioned on said mass adjacent the axis of bending of said spring, pins mounted on the opposite faces of said frame adjacent the free end of said mass, and strain wires mechanically mounted on and extending between the pins on the complementary faces of said frame and mass.

10. A strain wire accelerometer, comprising a frame having opposite faces, an inertial mass having opposite faces complementary to the faces of said frame, a flat spring mounted on said frame and upon one end of said inertial mass, the other end of said mass being free, pins mounted on each of the opposite faces of said mass and positioned on said mass adjacent the axis of bending of said spring, pins mounted on the opposite faces of said frame adjacent the free end of said mass, strain wires mechanically mounted on and extending between the pins on the complementary faces of said frame and mass and substantially parallel to the said faces and substantially perpendicular to the axis of bending of said spring.

LOUIS D. STATHAM.

No references cited.